United States Patent [19]

Bramnick et al.

[11] Patent Number: 5,564,054
[45] Date of Patent: Oct. 8, 1996

[54] FAIL-SAFE COMPUTER BOOT APPARATUS AND METHOD

[75] Inventors: Arnold H. Bramnick, Boca Raton; Douglas G. Elkins, Plantation; J. Robert Ure, Coral Springs, all of Fla.

[73] Assignee: International Business Machines Corporation, Armonk, N.Y.

[21] Appl. No.: 296,125

[22] Filed: Aug. 25, 1994

[51] Int. Cl.$^6$ .................................................. G06F 9/00
[52] U.S. Cl. ........................................ 395/700; 395/186
[58] Field of Search ................................... 395/700, 186, 395/188.01

[56] References Cited

U.S. PATENT DOCUMENTS

| | | | |
|---|---|---|---|
| 3,787,816 | 1/1974 | Hauck et al. | 395/650 |
| 4,335,426 | 6/1982 | Maxwell et al. | 364/200 |
| 4,468,734 | 8/1984 | Lanier et al. | 364/200 |
| 4,491,914 | 1/1985 | Sujaku | 395/700 |
| 4,570,085 | 2/1986 | Redfield | 307/453 |
| 4,979,106 | 12/1990 | Schneider | 364/200 |
| 5,128,995 | 7/1992 | Arnold et al. | 380/4 |
| 5,129,080 | 7/1992 | Smith | 395/575 |
| 5,206,860 | 4/1993 | Brown et al. | 371/20.1 |
| 5,210,875 | 5/1993 | Bealkowski et al. | 395/700 |
| 5,257,379 | 10/1993 | Cwiakala et al. | 395/700 |
| 5,408,666 | 4/1995 | Menut et al. | 395/700 |
| 5,410,699 | 4/1995 | Bealkowski et al. | 395/700 |

FOREIGN PATENT DOCUMENTS 4315211   4/1991   Japan ........................... G06F 1/24

*Primary Examiner*—Kevin A. Kriess
*Attorney, Agent, or Firm*—Bookstein & Kuderka

[57] ABSTRACT

Login files necessary to successfully boot a computer and corresponding to a preselected, minimal system configuration are stored in a predetermined location in a selected non-volatile mass storage device attached to the computer. These latter login files are not configurable by the user. During a boot process, the boot program first attempts to boot the system using the conventional user-configured login files. However, after a predetermined number of attempts to boot the system using the user-configured files, the boot process switches to the minimal system files and boots the system using these files.

22 Claims, 4 Drawing Sheets

FAIL-SAFE COMPUTER BOOT APPARATUS AND METHOD

FIELD OF THE INVENTION

This invention relates to methods and apparatus for starting, or booting, a personal computer.

BACKGROUND OF THE INVENTION

A conventional personal computer comprises a processor whose actions are controlled and coordinated by means of programs stored in main memory. For example, such programs may consist of operating system programs and application programs. The main memory is typically "volatile" and requires external electrical power to maintain its storage capability so that the programs in the main memory are erased whenever the electrical power is turned off or the computer is "powered down".

The computer is generally provided with additional non-volatile mass storage, typically in the form of magnetic media such as a "hard" or "floppy" disks on which relatively permanent copies of the programs can be stored. When the computer is initially turned-on or "powered up", some process or method must be used to load the programs from the non-volatile mass storage into the volatile main memory. In addition, the programs must often be specifically configured to work with the hardware which comprises the computer in order to place the computer in an operational state where it accepts user commands. Alternatively, even when power is continuously applied, the computer may reach a state where it no longer responds to user commands due to hardware or software malfunctions. In this case, the computer can be reset into a known state, generally without turning the electrical power off.

The phrase commonly used to denote the process of placing a personal computer into an operational state from either an unpowered state or a powered, but unresponsive state, is "bootstrapping" the computer or simply "booting" the computer. Booting a personal computer from an unpowered state is normally termed a "cold" boot and is initiated simply by applying power to the computer. Alternatively, it is possible to boot a computer from a powered state in a process called a "warm" boot. A warm boot is usually initiated by pressing a key combination or by actuating a special switch.

A boot process is a sequence of steps which are performed during the booting procedure. There are usually a number of discrete steps which are preprogrammed into a set of basic operating instructions called basic input-output system instructions or BIOS instructions. The BIOS instructions are conventionally stored in a battery-backed RAM memory called a non-volatile RAM or NVRAM so that they remain permanently in memory even when the computer electrical power is turned off.

The boot process for a cold boot usually starts by initiating a Power On Self Test (POST) routine that checks the integrity of basic hardware components, such as the main memory, the keyboard and the mass storage devices. If an error is detected in the hardware, then the boot process is stopped. Alternatively, if the POST routine indicates that the hardware is operating properly, then the boot process interrogates the system hardware device configuration and compares the detected configuration against a hardware specification entered by the computer user and stored in the NVRAM. Such a hardware configuration typically includes the number and types of mass storage devices, the amount of main memory, the type of keyboard and the availability of other devices such as co-processors etc.

If the detected hardware configuration does not match the hardware specification, then the boot process may be halted or a warning may be given to the user that the configuration and specification do not match and the boot process continued. However, if the boot process determines that the hardware is operating properly and the detected hardware configuration matches the stored hardware specification, then the boot process proceeds to load the operating system software from one of the mass storage devices and then to configure the operating system software by loading various hardware-specific software programs called "device drivers" and other basic software programs, such as memory management programs, from the mass storage devices into the computer main memory.

The installation order, type and storage location of the various operating system configuration programs are usually determined by one or more "login" files containing a list of selected operating system drivers and definitions. Finally, a set of predetermined system programs in one of the login files are run to complete the configuration of the operating system. To enable easy customization by the user, the login files for a personal computer are usually stored on one of the mass storage devices, such as the hard disk. The files to which the login files refer are also stored on one of the mass storage devices.

For example, on personal computers that use the MS-DOS® operating system developed and sold by Microsoft Corporation, Redmond, Wash., the operating system definitions and the system commands are kept in two login files that work in tandem. System definitions are normally placed in a disk file which is named CONFIG.SYS and system commands are placed in disk batch file named AUTOEXEC.BAT. During the booting process, the computer will first load the device drivers and the system definitions specified in the CONFIG.SYS file and then run the programs in the AUTOEXEC.BAT file. Once execution of the system commands in the AUTOEXEC.BAT file have been completed the system is ready for operation.

Normally the boot process proceeds to completion automatically without intervention of the user. However, the boot process of the operating system can fail and stop before completion for a number of reasons. For example, since the login files are easily accessible to the user, erroneous entries can be placed in the login files or the files can become damaged and unreadable. Alternatively, even if the login files are undamaged, they generally refer to other programs, files or system objects that are stored on the mass storage devices and these latter files can be missing or damaged and the boot process can fail. Finally, hardware devices checked or referenced during the boot process can fail and stop the process.

If the boot process fails, the computer does not become operational and will not respond to user commands. Consequently, the boot process must be reinitiated, but, unless the problem which caused the failure is corrected the reinitiated boot process will also fail. For example, in order to correct a failed boot process, the login configuration files can be edited to refer to the correct driver files or to bypass failed hardware or software programs. Unfortunately, the user must generally have an operational computer system in order to run an editing program and repair the damage.

Consequently, it is standard practice to make a copy of the login files, which copy is stored on removable storage media, such as a floppy disk. If a problem is encountered during a boot process initiated using the normal login files stored on the hard disk, the removable floppy disk can be inserted into an appropriate drive and the system booted using the login files stored on the floppy disk. However, the user has not made a copy of the login files prior to the boot process failure or, if the system does not have mass storage devices with removable media (some systems are configured with only a CD-ROM drive and a hard disk), the user is left relatively helpless without an operational system to correct the problem.

Accordingly, it is an object of the present invention to recover from a failure during a boot process.

It is another object of the present invention to recover from a failure during a boot process without user intervention.

It is a further object of the present invention to automatically change the login files during a failure in the boot process.

It is yet another object of the present invention to configure the system in a minimal configuration if a boot process failure occurs.

SUMMARY OF THE INVENTION

The foregoing objects are achieved and the foregoing problems are solved in one illustrative embodiment of the present invention in which login files necessary for a successful boot process and corresponding to a preselected, minimal system configuration are stored in a predetermined location in a selected non-volatile mass storage device. These latter login files are not configurable by the user. During the boot process, the boot program first attempts to boot the system using the conventional user-configured login files. However, after a predetermined number of attempts to boot the system using the user-configured files, the boot process switches to the minimal system files and boots the system using these files.

After the system has been successfully booted, if more than one attempt was necessary to boot the system, the user is informed that the system did not boot using the conventional login files. Consequently, a typical user will have three boot configurations, including the preselected minimal system configuration, a previous system configuration which has been previously used to successfully boot the computer and the current configuration which may or may not work.

More particularly, the boot process determines whether a previous boot attempt has been made using the user-configured login files by checking the main memory for a "boot signature" pattern which is a predetermined bit pattern with a low probability of appearing in the memory by chance. The absence of such a pattern indicates that the conventional login files have not previously been used during the present boot process. If the pattern is absent, the signature pattern is written into memory and the boot process is attempted using the user-configured login files. If the boot process is not successful, a subsequent "warm" boot process is attempted and, in this latter case, the boot signature pattern will be detected indicating a previous attempt has been made.

After a predetermined number of unsuccessful boot attempts, the login files with the preselected minimal configuration are used to boot the computer. After a successful boot operation, if more than one boot attempt was made, the user is informed that the system did not boot using the user-configured login files.

BRIEF DESCRIPTION OF THE DRAWINGS

The above and further advantages of the invention may be better understood by referring to the following description in conjunction with the accompanying drawings and which.

DESCRIPTION OF THE PREFERRED EMBODIMENT

Figure 1:
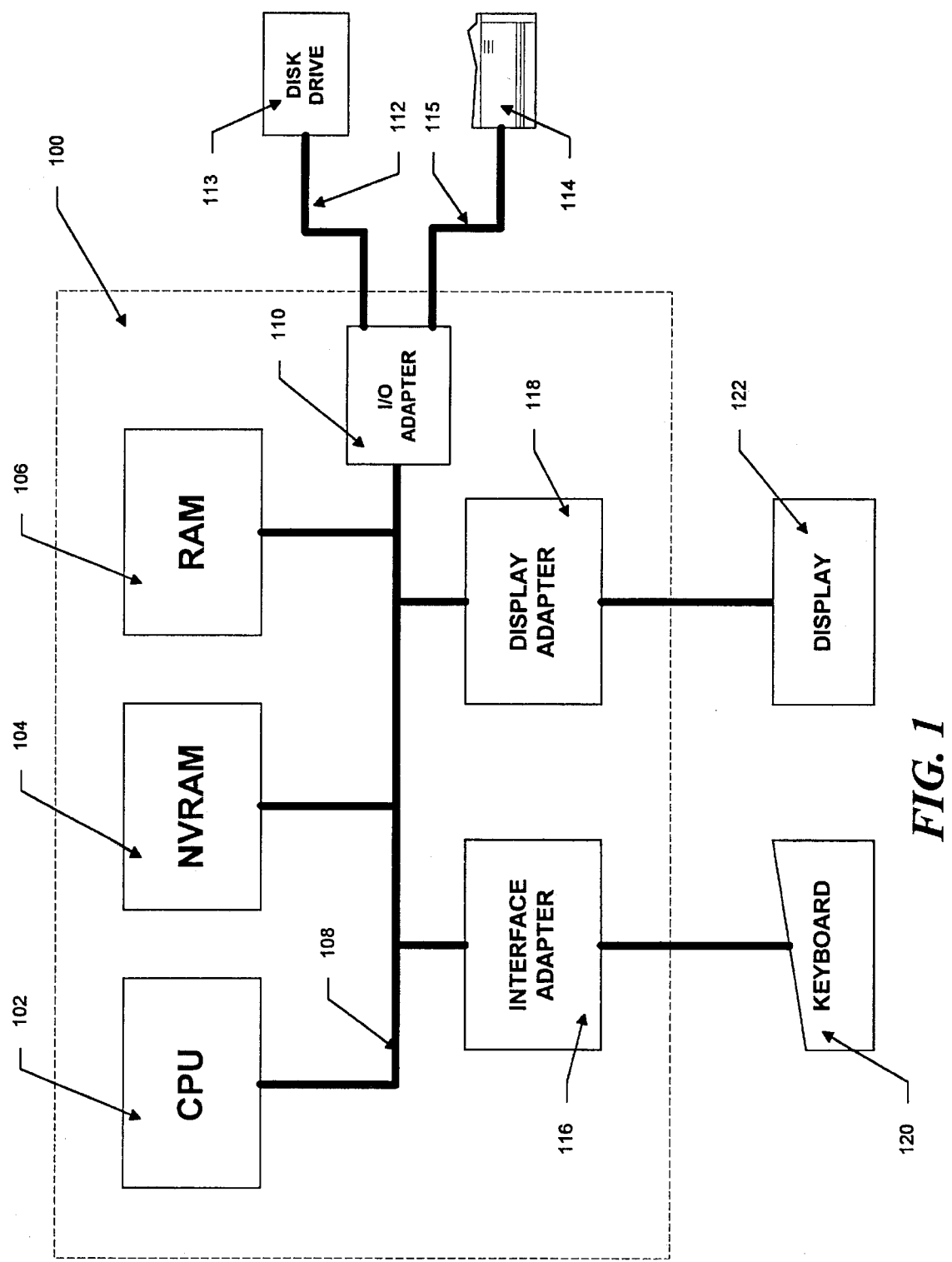
FIG. 1 is a block schematic diagram of a computer system, for example, a personal computer system, on which the inventive boot process operates.

The invention is preferably practiced in the context of an operating system resident on a personal computer such as the IBM® PS/2® or Apple® Macintosh® computer. A representative hardware environment is depicted in FIG. 1, which illustrates a typical hardware configuration of a computer 100 in accordance with the subject invention. The computer 100 is controlled by a central processing unit 102 (which may be a conventional microprocessor) and a number of other units, all interconnected via a system bus 108, are provided to accomplish specific tasks. Although a particular computer may only have some of the units illustrated in FIG. 1, or may have additional components not shown, most computers will include at least the units shown.

Specifically, computer 100 shown in FIG. 1 includes a random access memory (RAM) main memory 106 for temporary storage of information, a nonvolatile random access memory (NVRAM) 104 for permanent storage of the computer's configuration and basic input/output system (BIOS) and an input/output (I/O) adapter 110 for connecting peripheral devices such as a mass storage device 113 and printer 114 to the bus 108, via cables 115 and 112, respectively. The NVRAM 104 is typically a low-power memory device such as a CMOS memory which is powered by a long-life battery so that it retains information even if the computer power is turned-off. The BIOS stored in the NVRAM 104 generally has a non-user-accessible portion and a user-accessible portion which contains hardware specifications for the various hardware devices that comprise the computer.

A user interface adapter 116 is also provided for connecting input devices, such as a keyboard 120, and other known interface devices including mice, speakers and microphones to the bus 108. Visual output is provided by a display adapter 118 which connects the bus 108 to a display device 122, such as a video monitor. The workstation has resident thereon and is controlled and coordinated by operating system software such as the OS/2® operating system developed and sold by the International Business Machines Corporation, Boca Raton, Fla.

Figure 2:
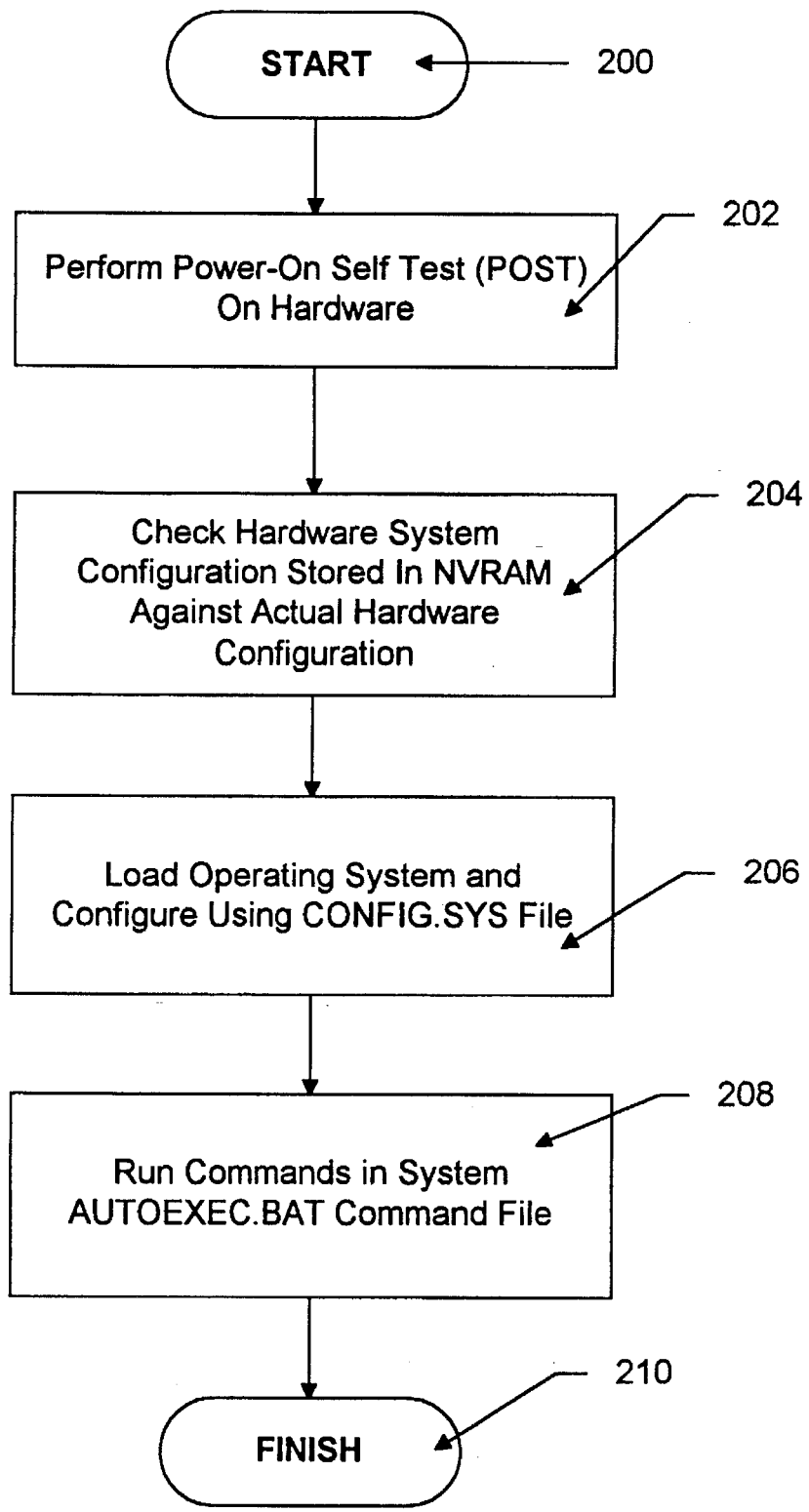
FIG. 2 is an illustrative flowchart of a prior art boot process by which a personal computer is started.

FIG. 2 is a flowchart of an illustrative boot process found in the BIOS of many personal computers using the MS-DOS® operating system. The illustrated routine commences at step 200 and proceeds to step 202 where a power-on self test routine is conducted on the hardware. Such a test routine usually performs only rudimentary tests on basic portions of the system hardware such as the main RAM memory, the keyboard, the mouse, the display and the disk drive on which the operating system software is stored.

If the power-on self test indicates that one or more hardware devices have failed, generally the boot process is halted and the user receives an error message. If the power-on self test routine indicates that all checked hardware components are operational, the boot process proceeds to step 204 in which the hardware specifications stored in NVRAM 104 in the user-accessible section of the BIOS are checked against the actual hardware configuration of the computer. For example, the specified size of the memory is checked against the actual memory size, the number and types of disk drives are checked and a number of other basic operating checks are made to determine whether the hardware is configured in accordance with the stored specification. Generally, if a discrepancy is detected between the specified and actual hardware, the boot process continues although a warning notice is generally displayed.

In step 206 the basic operating system (generally the file COMMAND.COM in an MS-DOS® system) is loaded from one of the mass storage devices and configured using the contents of the CONFIG.SYS file. Next, in step 208, the programs and commands in the AUTOEXEC.BAT system batch command file are executed. When these latter commands are complete, the system becomes functionally operational with a configured operating system.

A problem during the boot process typically occurs in steps 206 and 208 if improper system definitions or commands have been entered by the user in the CONFIG.SYS or AUTOEXEC.BAT files, or if the files become damaged. Alternatively, the login files may refer to other programs or hardware components which do not exist or have failed. In this case, although the basic operating system has been loaded, it cannot be configured properly and the boot process stops and displays an error message.

Generally, an operational computer is needed in order to change the contents of the login files by means of an editing program. If the boot process stops and the computer does not become operational, it may not be possible for the user to edit the file and correct the problem.

Accordingly, in accordance with the principles of the present invention, an alternative set of login files or boot configuration is permanently stored in the system in a known location. This alternative boot configuration is a "minimal" system in that it includes only the hardware and software necessary to boot an operational system and excludes any hardware devices and software that are not critical and that might fail during a normal boot process. This minimal system is stored in a "boot registry" or a set of login files which describes the minimal system.

Figure 3A:
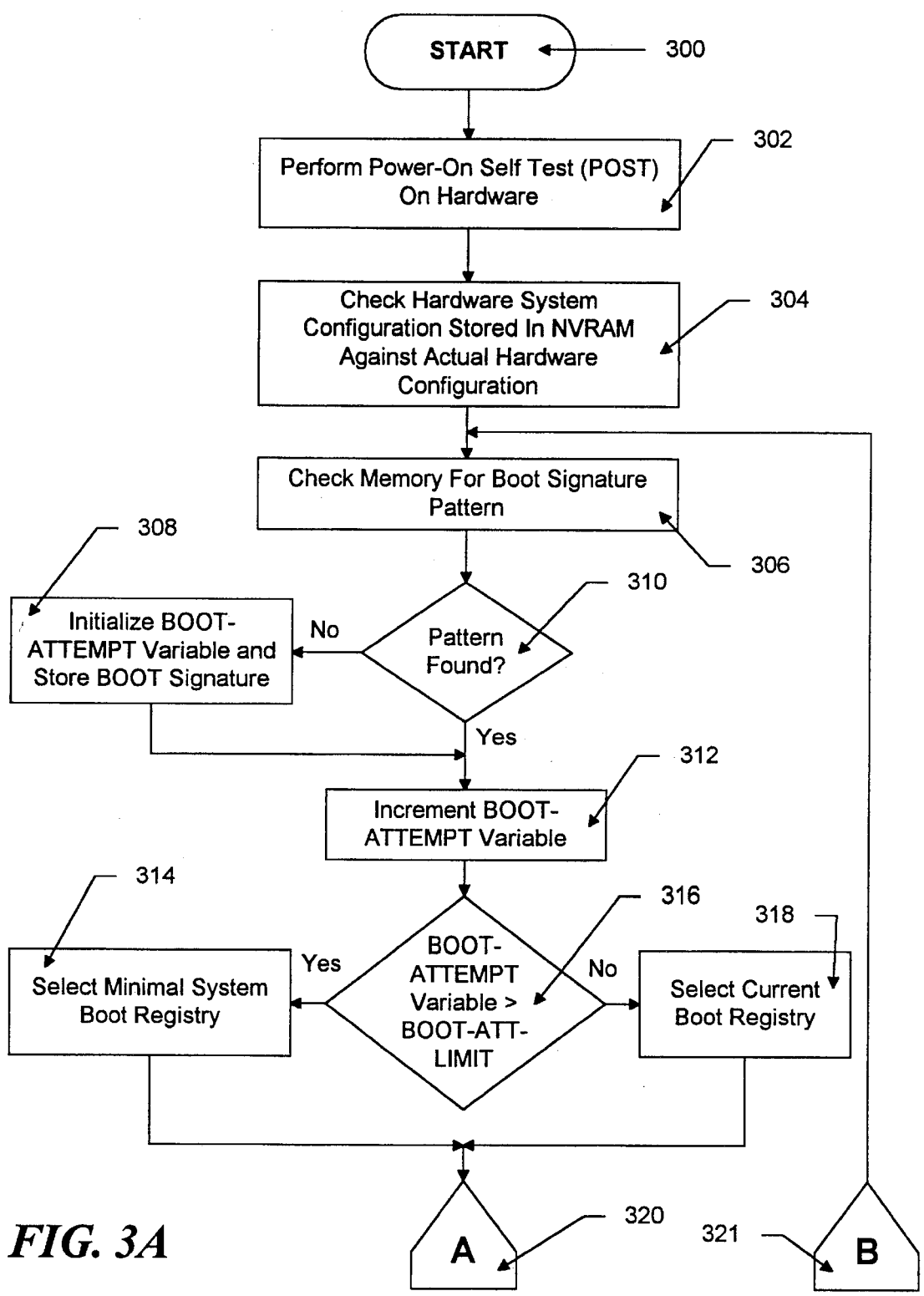
FIGS. 3A and 3B, when placed together, form an illustrative flowchart of an inventive boot process by which a personal computer can be restarted in the event of a boot process failure.
Figure 3B:
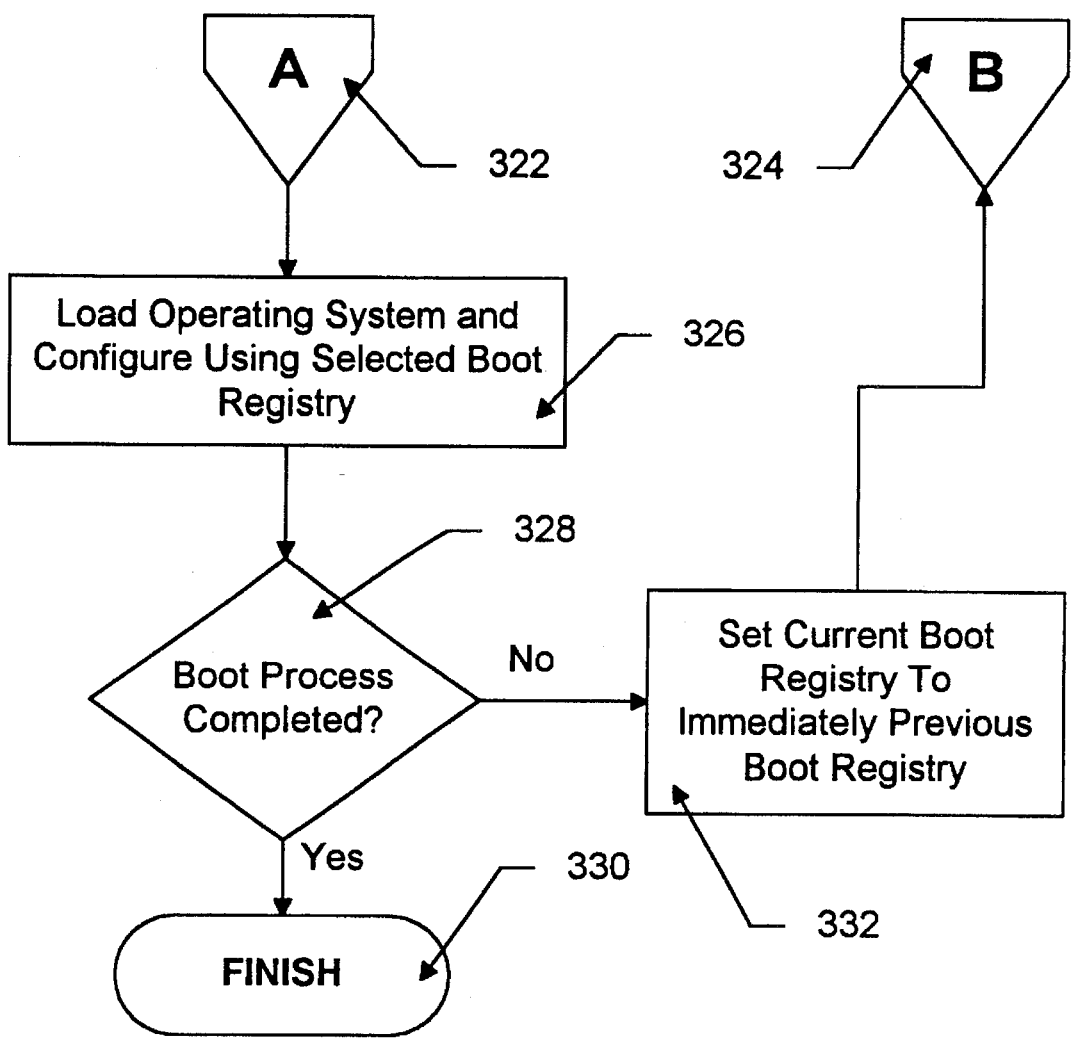

The minimal system boot registry is used as an alternative to the normal boot registry by modifying the normal boot process shown is FIG. 2 to that shown in FIGS. 3A and 3B. The inventive routine starts in step 300 and proceeds to step 302 where the power-on self test is conducted on the hardware in the manner previously described. Next, in step 304, the hardware system configuration stored on the NVRAM 104 is compared against the actual hardware configuration also in the same manner as performed in the prior art boot process.

In step 306, the main memory is checked for a boot "signature" pattern. This pattern is a predetermined bit pattern which is unlikely to occur in the memory due to the normal operation of the system or through random processes. For example, the pattern might initially be generated using eight, or more, bytes of randomly-generated information. In any case, the boot signature pattern is predetermined before the boot process is commenced and the system main memory is searched sequentially for the predetermined pattern. In decision block 310, a determination is made whether the predetermined boot signature pattern has been found.

If the pattern was not found during the search, the routine proceeds to step 308 where selected variables used in the boot process are initialized and the predetermined boot signature pattern is stored in the memory to indicate that a boot attempt has been made. Several variables are used during the inventive boot process, including a BOOT-ATTEMPT variable which indicates the number of unsuccessful boot attempts and a BOOT-ATTEMPT-LIMIT variable which is the total number of unsuccessful boot attempts that are permitted using a given boot registry. The BOOT-ATTEMPT variable is initially set to zero.

Alternatively, if, in step 310, the boot signature pattern is located in the memory, indicating that a previous boot attempt has been made, the boot process proceeds to step 312 where the BOOT-ATTEMPT variable is incremented to indicate another boot attempt. In the case of the first attempt, the BOOT-ATTEMPT variable will now equal one, otherwise the variable will equal to the number of previous attempts made to boot the system.

Next, in decision block 316, the BOOT-ATTEMPT variable is compared to the predetermined BOOT-ATTEMPT-LIMIT variable. This comparison is made to prevent a failure in the boot process caused by, for example, a transient malfunction in the hardware that stops the boot process from completing, but does not reoccur. Accordingly, several attempts may be made to boot the computer using the same boot registry in order to eliminate any such transient problems. If the value of the BOOT-ATTEMPT variable is less than the value of the predetermined BOOT-ATTEMPT-LIMIT variable, the system proceeds to step 318 where the current login files in the corresponding "boot registry" are selected for use by the current boot process. The routine then proceeds, via off-page connectors 320 and 322, to step 326 where the operating system is loaded and an attempt is made to configure the operating system using the login files selected in step 318.

A determination is made in decision block 328 as to whether the boot process has been completed. This determination can be made in one of several ways. For example, in the case of a non-fatal error on boot-up where the software encounters a problem, but continues to run, the boot software itself may trigger a rebooting process. Alternatively, if the software is sufficiently damaged that it can no longer run, a rebooting process can be triggered by a "watchdog" timer that generates a non-maskable interrupt after a predetermine time interval has expired in order to trigger the rebooting process (the watchdog timer is reset if the boot process successfully completes so that it does not trigger a reboot). Finally, the user may become aware that the boot process was not successful (after a prolonged time interval of system inactivity) and can trigger a rebooting process by pressing a "hot" key sequence (such as CONTROL-ALT-DELETE).

If the boot process has successfully completed, the routine finishes in step 330. Alternatively, if the boot process does not complete, then the routine proceeds to step 332 where the boot registry is set to the immediately previous boot registry. More particularly, in accordance with the principles of present invention, there will always be at least two boot registries available. One boot registry will correspond to the current system configuration and the other will correspond to the predetermined minimal configuration. In addition, the user may be provided with a mechanism to save additional configurations that have booted successfully into other boot registries. Consequently, a typical user will have three boot registries: one describing the minimal system configuration, another describing a previous system configuration that booted successfully, and a third describing the current system configuration.

These boot registries can be thought of a forming a sequence. If the current boot registry does not boot the system, in step 332, the "current" boot registry (the set of files which will be used for the next boot attempt) is set to the immediately previous boot registry in the chain. If this latter boot registry does not boot the system, then the next boot registry further back in the chain is used etc.

After setting the "current" boot registry, the routine proceeds, via off-page connectors 324 and 321, back to step 306 where the memory is again checked for the presence of a boot signature pattern to determine whether a boot attempt has been made using the current boot registry. Steps 308–328 are then repeated so that several attempts are made to boot the computer using the current boot registry. Operation continues in this manner until the number of boot attempts is greater that the boot attempt limit as determined in decision block 316.

If, in step 316, the number of boot attempts using the current boot registry exceeds the boot attempt limit, then the routine proceeds to step 314 where the aforementioned minimal system login files in their boot registry files are selected. The illustrative boot process then proceeds, via off-page connectors 320 and 322, to attempt boot the system using the minimal system login files. Assuming the minimal system hardware and software components are present and undamaged, the computer will boot using this minimal configuration and the user can then edit the boot registry that interrupted the boot process in order to correct the booting problem.

Although only one embodiment has been explained in detail herein, other changes and modifications will be immediately apparent to those skilled in the art. The following claims are intended to cover those additional modifications and changes which are apparent to those skilled in the art.

What is claimed is:

1. Apparatus for booting a computer in response to a boot command, the computer having a processor, a main volatile storage for storing programs for controlling the processor and an external non-volatile storage containing an operating system and apparatus responsive to the boot command for beginning a boot process by loading the operating system from the external storage into the main storage, the booting apparatus comprising:

a first plurality of login files corresponding to a user-changeable system configuration;

a second plurality of login files corresponding to a predetermined system configuration;

first apparatus operable after the operating system has been loaded into the main storage and responsive to the boot command for configuring the operating system using the first plurality of login files;

apparatus responsive to the configuration of the operating system for determining whether the boot process completes;

apparatus responsive to the boot command for searching the main storage to locate a predetermined boot signature pattern; and second apparatus responsive to a determination that the boot process has not completed for configuring the operating system using the second plurality of login files.

2. Apparatus for booting a computer according to claim 1 wherein the determining apparatus comprises:

apparatus for starting another boot process if a particular boot process does not complete;

counting apparatus responsive to each start of a boot process for generating a count representing a number of starts; and apparatus for determining that the boot process did not complete when the count exceeds a predetermined number.

3. Apparatus for booting a computer according to claim 2 wherein the counting apparatus comprises:

apparatus operable when the boot signature pattern is located for resetting the count.

4. Apparatus for booting a computer according to claim 1 wherein the second plurality of login files comprises login files for a minimal system configuration that comprises only components of the computer necessary for booting the computer.

5. Apparatus for booting a computer according to claim 1 further comprising means operable on a previously-booted computer for creating the first plurality of login files and for storing the first plurality of login files in a first boot registry location.

6. Apparatus for booting a computer according to claim 1 further comprising means operable on a previously-booted computer for creating the second plurality of login files and for storing the second plurality of login files in a second boot registry location.

7. Apparatus for booting a computer according to claim 1 further comprising means responsive to a completion of a boot process for storing the first plurality of login files in a third boot registry location.

8. A computer system being bootable in response to a boot command, the computer system comprising:

a processor;

a main volatile storage for storing programs for controlling the processor;

an external non-volatile storage containing an operating system;

apparatus responsive to the boot command for beginning a boot process by loading the operating system from the external storage into the main storage;

a first plurality of login files corresponding to a user-changeable system configuration stored in the external storage;

a second plurality of login files corresponding to a predetermined system configuration stored in the external storage;

first apparatus operable after the operating system has ben loaded into the main storage and responsive to the boot command for configuring the operating system using the first plurality of login files;

apparatus responsive to the configuration of the operating system for determining whether the boot process completes;

apparatus responsive to the boot command for searching the main storage to locate a predetermined boot signature pattern; and second apparatus responsive to a determination that the boot process has not completed for configuring the operating system using the second plurality of login files.

9. A computer system according to claim 8 wherein the determining apparatus comprises:

apparatus for starting another boot process if a particular boot process does not complete;

counting apparatus responsive to each start of a boot process for generating a count representing a number of starts; and apparatus for determining that the boot process did not complete when the count exceeds a predetermined number.

10. A computer system according to claim 9 wherein the counting apparatus comprises:

apparatus operable when the boot signature pattern is located for resetting the count.

11. A computer system according to claim 10 wherein the second plurality of login files comprises login files for a minimal system configuration that comprises only components of the computer necessary for booting the computer.

12. A computer system according to claim 11 further comprising means operable on a previously-booted computer system for creating the first plurality of login files and for storing the first plurality of login files in a first boot registry location.

13. A computer system according to claim 12 further comprising means operable on a previously-booted computer system for creating the second plurality of login files and for storing the second plurality of login files in a second boot registry location.

14. A computer system according to claim 13 further comprising means responsive to a completion of a boot process for storing the first plurality of login files in a third boot registry location.

15. A computer system according to claim 8 wherein the apparatus for beginning a boot process comprises a non-volatile startup storage and a boot program stored in the startup storage.

16. A method for booting a computer in response to a boot command, the computer having a processor, a main volatile storage for storing programs for controlling the processor and an external non-volatile storage containing an operating system, the method comprising the steps of:

A. a first plurality of login files corresponding to a user-changeable system configuration;

B. creating a second plurality of login fields corresponding to a predetermined system configuration;

C. loading the operating system from the external storage into the main storage in response to the boot command;

D. configuring the operating system using the first plurality of login files;

E. determining whether the boot process completes by searching the main storage to locate a predetermined boot signature pattern; and F. configuring the operating system using the second plurality of login files when the boot process does not complete.

17. A method for booting a computer according to claim 16 wherein step E comprises the steps of:

E1. starting another boot process if a particular boot process does not complete;

E2. generating a count representing a number of starts; and

E3. determining that the boot process did not complete when the count exceeds a predetermined number.

18. A method for booting a computer according to claim 17 wherein step E2 comprises the steps of:

E2A. resetting the count when the boot signature pattern is located.

19. A method for booting a computer according to claim 16 wherein step B comprises the step of:

B1. creating a plurality of login files for a minimal system configuration that comprises only components of the computer necessary for booting the computer.

20. A method for booting a computer according to claim 16 further comprising the steps of:

G. creating the first plurality of login files; and

H. storing the first plurality of login files in a first boot registry location.

21. A method for booting a computer according to claim 16 further comprising the steps of:

I. creating the second plurality of login files; and

J. storing the second plurality of login files in a second boot registry location.

22. A method for booting a computer according to claim 16 further comprising the step of:

K. storing the first plurality of login files in a third boot registry location when a boot process has been completed.

* * * * *